March 25, 1969  F. E. STUART  3,434,699
METHOD AND APPARATUS FOR WATER TREATMENT
Filed June 26, 1967  Sheet 1 of 4

Inventor
FRED E. STUART
by Melvin J. Crosby

Inventor
FRED E. STUART

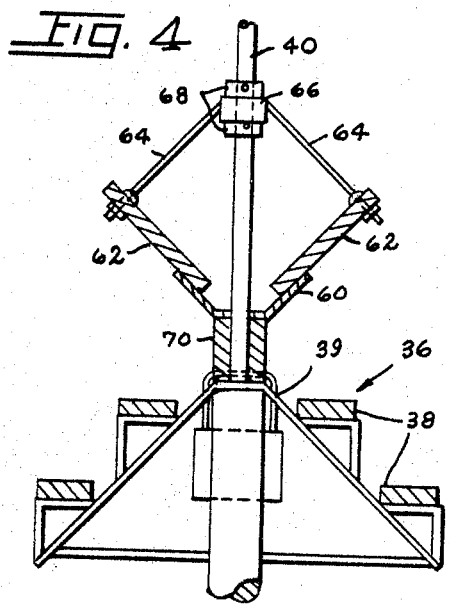
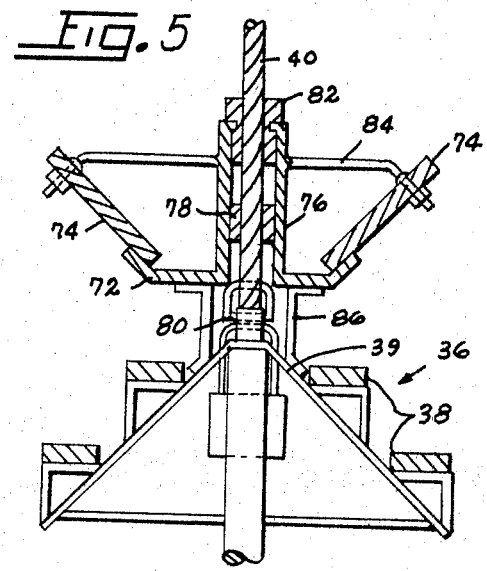
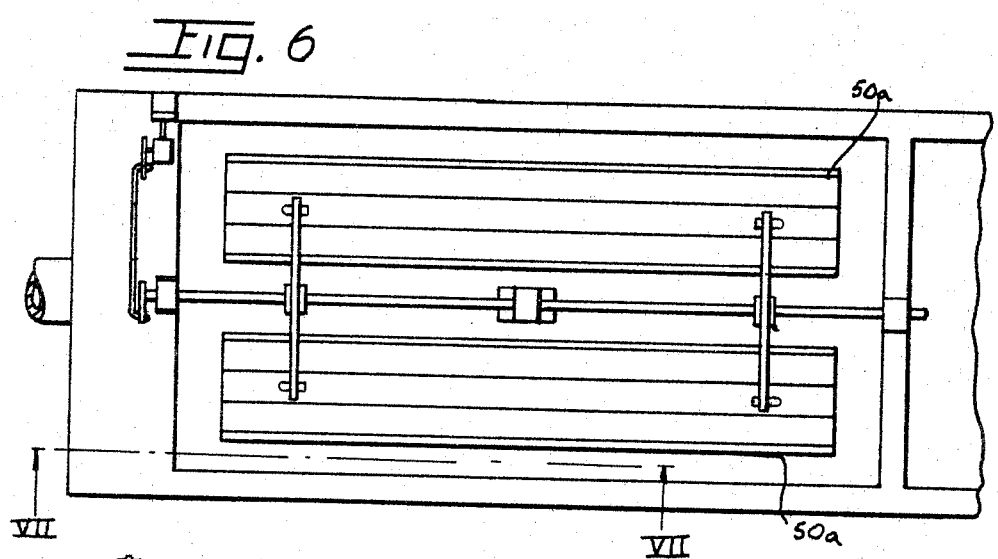
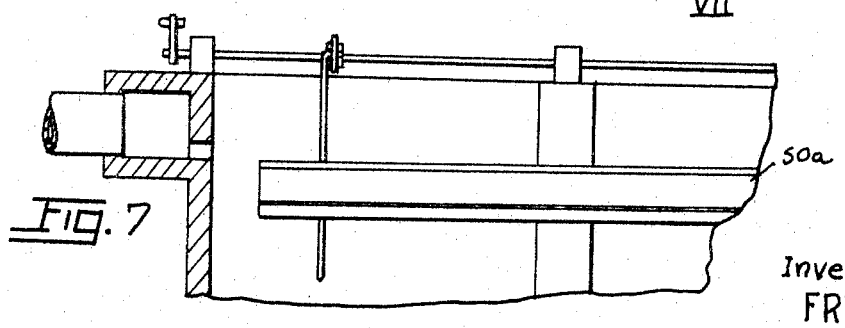

Inventor
FRED E. STUART

United States Patent Office 3,434,699
Patented Mar. 25, 1969

3,434,699
METHOD AND APPARATUS FOR WATER TREATMENT
Fred E. Stuart, 1157 Bel Air Drive, Daytona Beach, Fla. 32018
Filed June 26, 1967, Ser. No. 648,754
Int. Cl. B01f 15/02, 13/00
U.S. Cl. 259—4                                    17 Claims

ABSTRACT OF THE DISCLOSURE

Liquid treatment method and apparatus in which walking beam type agitators in a flocculating tank carry upwardly opening troughs which are inclined downwardly toward at least one end and lift water out of the tank when the pertaining end of the beam moves upwardly, whereupon the liquid flows out the low end of the trough thereby inducing circulation of the liquid in the tank.

---

The present invention is particularly concerned with improvements in the construction and method of operation of the flocculation basin portion of a water treatment system and especially with a method and apparatus for inducing circulation of water in the flocculation basin.

In the usual system of the nature with which the present invention is concerned, water enters one end of a flocculation basin and flows therethrough to a settling basin at the other end, with walking beams or other agitating or stirring means being provided to admix the influent liquid and prepare the liquid for proper settling conditions in the settling basin. The basins, or tanks, can be open or closed and, normally, the liquid flow through the flocculation chamber is merely from end to end.

I have found, by test and experimentation, that improved treatment of the liquid in the flocculation basin can be had by recirculating a portion of the liquid so that more intimate admixing of the water and the flocculating agents supplied thereto ahead of the flocculation basin will be had. More uniform and more efficient settling of the flocculant in the settling basin results and, therefore, cleaner water is produced. The control of the feed of the flocculating agents is less critical than heretofore and at least the flocculation chamber can be made smaller than heretofore, if desired.

Accordingly, a primary object of the present invention is the provision of an improved method and apparatus for the flocculating basin portion of a water treatment system.

Another object is the provision of a method and apparatus for causing intimate mixing of the water and flocculating agents in the flocculating basin of a water treatment system.

A particular object of the present invention is the provision of a method and apparatus for recirculating a portion of the water in a flocculation basin as it passes therethrough.

Another object is the provision of a method and apparatus of the nature referred to which is compact and inexpensive and adapted for incorporation in existing installations as well as in new installations.

A still further particular object is the provision of a method and apparatus for aerating the liquid while it is in the flocculation basin with simultaneous recirculation thereof.

The foregoing objects, as well as other objects and advantages of the present invention will become apparent upon reference to the following specification taken together with the accompanying drawings, in which:

FIGURE 4 is a fragmentary view showing how a recirculating trough according to the present invention is secured to a walking beam agitator having a rod type suspension;

FIGURE 5 is a view like FIGURE 4 but shows a cable type suspension for the agitator;

FIGURE 6 is a plan view like FIGURE 2 but shows the walking beam agitator and the recirculating troughs extending through the basin in the direction of liquid flow therethrough;

FIGURE 7 is a section on line VII—VII of FIGURE 6; and

In general, the present invention is practiced by maintaining upwardly opening troughs on the walking beam agitator structure of a flocculating basin which are submerged when the beam goes down and which lift out of the liquid when the beam goes up. The troughs pick up liquid which spills out one or both ends of the trough.

The walking beam agitators, known per se, may extend transversely in the flocculation basin or longitudinally therein. The walking beam structures comprise one or more spaced parallel shafts, each having two or more beam elements fixed thereto in spaced parallel relation. The beam elements are connected in the center to the shaft and beneath each shaft and parallel thereto and on each side thereof are agitator structures which are pivotally suspended from the ends of the beam elements thereabove. The shafts are oscillated in unison and this causes the agitator structures to alternately raise and lower in the liquid and thereby to admix and agitate the liquid. The agitator structures, in normal operation, always remain submerged in the liquid.

The liquid normally enters the flocculation basin at one end and flows therethrough to the other end and passes to a settling chamber through a suitable baffle wall, a screen, for example.

The troughs which are mounted on the agitator structures can extend laterally in the flocculation basin or longitudinally therein, depending on the construction of the agitators.

Gutters can be provided on one or both side walls of the basin which recline the liquid from the lateral troughs and return it to the inlet end of the basin. The longitudinal troughs do not require return gutters but will, by their construction, move the liquid from end to end in the basin.

The troughs can be interrupted, or formed in a series of steps, so the liquid drops in flowing along the troughs and thus becomes aerated. This modification is especially effective for the longitudinal troughs which are long enough to have several steps therein.

The troughs can all incline in one direction or can be inclined, one in one direction, and the next in the opposite direction. Further, the troughs could incline downwardly from the center toward both ends.

In any event, on each upward movement of a trough, liquid is lifted out of the body of liquid in the flocculation basin and transferred, with or without aeration in the trough, to another region in the basin.

Figure 1:
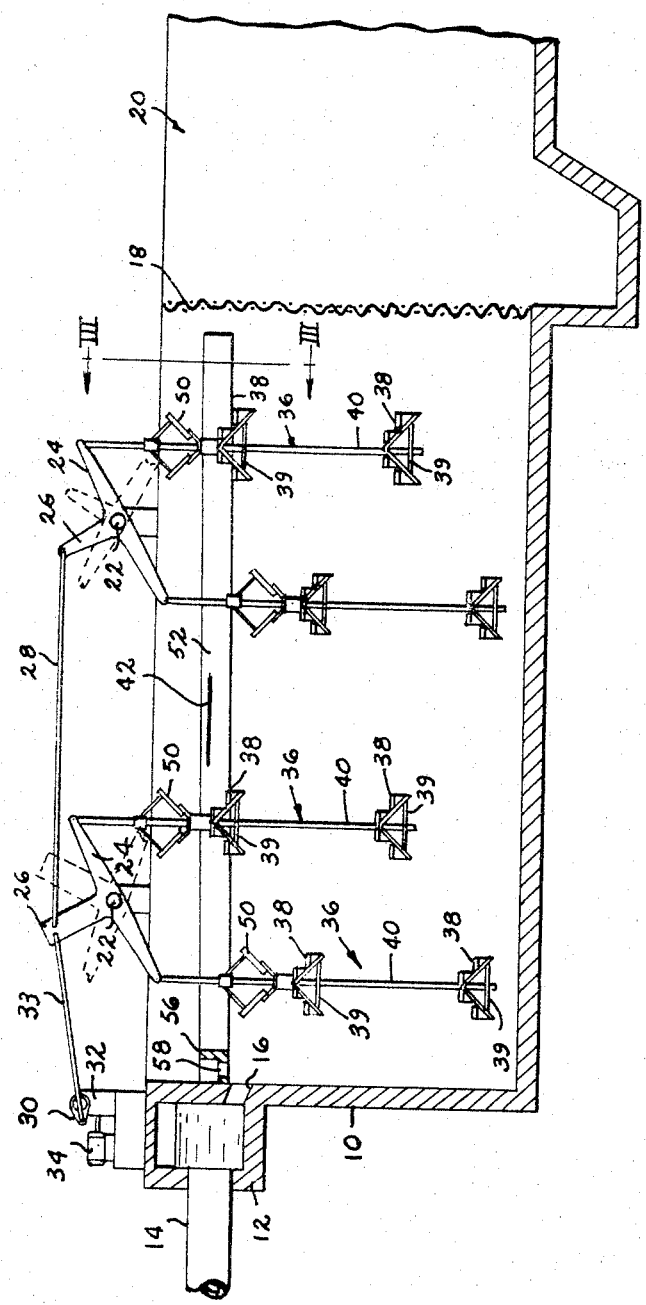
FIGURE 1 is a longitudinal section through a flocculation basin according to the present invention and is indicated by line I—I in FIGURE 2.
Figure 2:
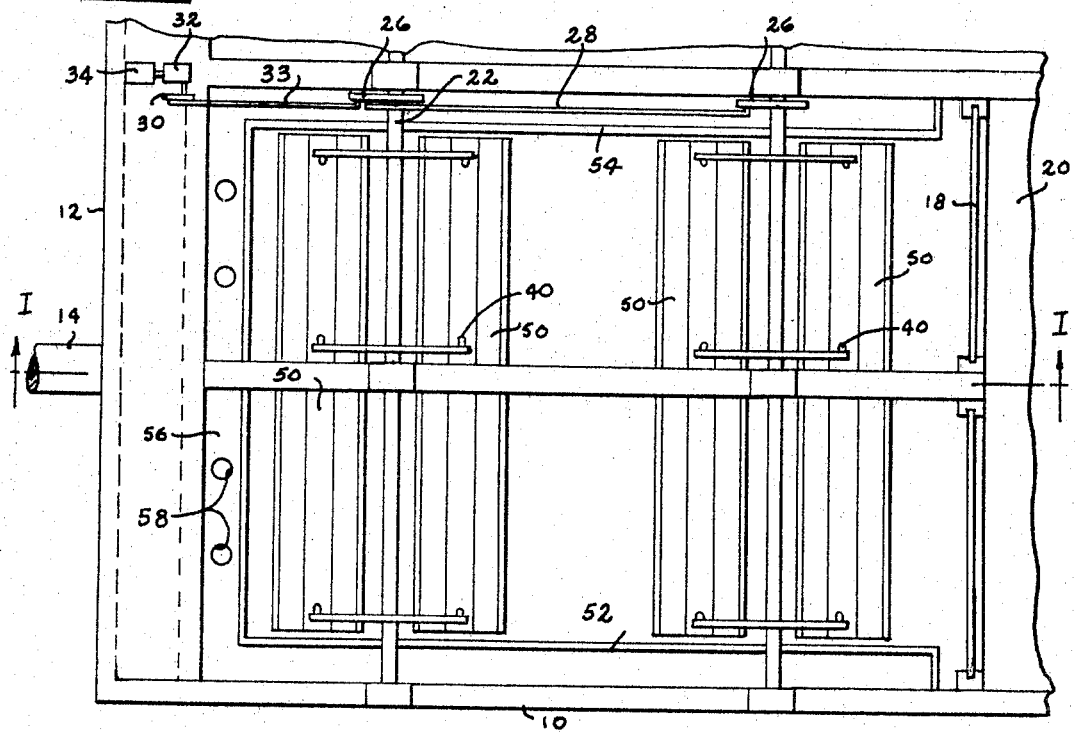
FIGURE 2 is a plan view of the basin shown in FIGURE 1.
Figure 3:
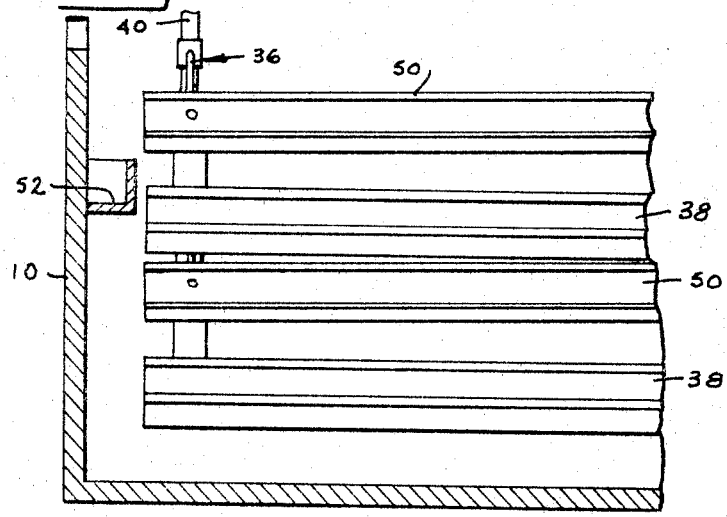
FIGURE 3 is a transverse section through the basin as indicated by line III—III in FIGURE 1.

Referring to the drawings more in detail; FIGURES 1, 2 and 3 show a flocculation basin 10 with an inlet header 12 which receives influent via conduit 14 from mixers (not shown). The influent passes through ports 16 into basin 10 and then through the length of the basin and through baffle wall 18 at the opposite end into settling basin 20.

Extending laterally across the top of basin 10 are shafts 22 supported in any conventional manner. Each shaft 22 has beam elements 24 fixed thereto with at least one set of the elements having drive arms 26. Arms 26 are pivotally interconnected by link 28 and to the rotating arm 30 of a geared speed reducer 32 by a link 33. Motor 34 drives the speed reducer which, as will be seen, will rotate arm 30 and cause beam elements 24 to oscillate continuously between their full line positions and their dotted line positions, as shown, in FIGURE 1.

The beam elements 24 have two aligned equal length arms and pivotally suspended from the arms on each side of a shaft 22, is an agitator structure portion generally indicated at 36. Each portion 36 has agitator elements 38 extending parallel to shaft 22 and carried on a frame 39 to which a drop arm 40 is connected that leads upwardly to the one of the arms of a beam element 24 thereabove and is pivotally connected thereto. By the described arrangement, the portions 36 of each agitator structure move in respectively opposite vertical directions and produce the desired agitating action. As will be seen, the liquid level at 42 is above the uppermost level attained by the agitator structure portions 36.

In FIGURES 1, 2 and 3, only a single basin 10 is shown with two transverse agitators therein. However, the basins can be larger and have more than two agitators therein, or the basin can be operated in multiple in parallel. Also the agitators could extend longitudinally therein, as will be seen hereinafter, and could, as will also be seen, comprise a single walking beam arrangement.

According to the present invention, troughs 50 are mounted on the agitator structure portions 36 and move upwardly and at at least one end. Troughs 50 are at such an elevation that when the pertaining portion 36 goes down, the trough will be submerged in the liquid and, when the pertaining portion 36 comes up, the trough will be lifted above liquid level 42. The liquid picked up in the trough will pour out the open end, or ends, of the trough while it is elevated and will thus transfer the liquid from one region of the basin to another.

I propose, further, to provide gutter means on the inside of the basin to receive the liquid pouring from the elevated troughs and to convey it to a predetermined region of the basin.

FIGURES 2 and 3 will show gutters 52 and 54 on the side walls of basin 10 to receive the liquid from the troughs 50. Gutters 52 and 54 incline downwardly toward the inlet end of basin 10 and join a transverse gutter 56 which has ports 58 through which the recirculated liquid returns to the basin adjacent the influent liquid entering the basin from header 12.

In FIGURES 1, 2 and 3, adjacent troughs 50 incline downwardly in respectively opposite directions but, and particularly in a narrower basin, the troughs might all incline in only one direction. Further, the troughs could incline in both directions from the center, if desired.

The mounting of troughs 50 on the agitator structure portions 36 is shown in FIGURES 4 and 5.

In FIGURE 4, the drop arms 40 are in the form of rods fixed to frame 39 in any suitable manner. Trough 50 comprises a metal angle 60 apertured to pass the rods. Boards 62 are attached at their lower edges to angle 60 and form the trough. Brace rods 64 are connected to the upper edges of boards 62 and extend to a collar 66 surounding the pertaining one of the rods. Collar 66 may be held fixedly in place on its rod by stop collars 68 pinned to the rod. Spacer 70 beneath angle 60 rests on frame 39 and assists in supporting the trough on the rod.

Other trough and supporting structures are, of course, possible within the scope of this invention.

FIGURE 5 shows drop arm 40 in the form of a cable. The trough in this case has a metal strip 72 at the bottom with its side edges turned up to engage the lower edges of boards 74. Tubes 76 welded to strip 72 pass the cables and, when necessary, can accommodate clamp 78 which secures the cable to clevis 80 at the top of frame 39. A rubber-like bushing 82 at the top of each tube 76 holds it firmly on its cable. The upper edges of boards 74 are braced on tubes 76 by brace rods 84. The entire trough structure may rest on frame 39 by a tubular spacer or may be supported thereon by metal members 86, as shown.

As in connection with FIGURE 4, other trough and supporting structures therefor are possible.

As mentioned, either of the troughs of FIGURE 4 or 5 may incline downwardly in the end to end direction from either end to the other or may incline downwardly from the center to both ends.

The basin shown in FIGURES 1, 2 and 3 has transversely extending agitator structures therein while the arrangement of FIGURES 6 and 7 has longitudinally extending agitator structures. The arrangements are the same and no detailed description of the FIGURES 6 and 7 basins is included. The corresponding parts are correspondingly numbered with the addition of a subscript $a$. The real difference to be found in the FIGURES 6 and 7 modification is that the recirculating troughs 50a extend longitudinally of the basin and, thus, inherently effect recirculation of the liquid without requiring gutters on the side walls of the basin.

In FIGURES 6 and 7, both troughs 50a shown could incline downwardly toward either end of the basin, preferably toward the inlet end, or one could incline downwardly toward each end of the basin. In the first case, mass circulation of the liquid in the basin in a vertical plane would occur while, in the second case, mass circulation of the liquid in a horizontal plane would occur.

Figure 8:
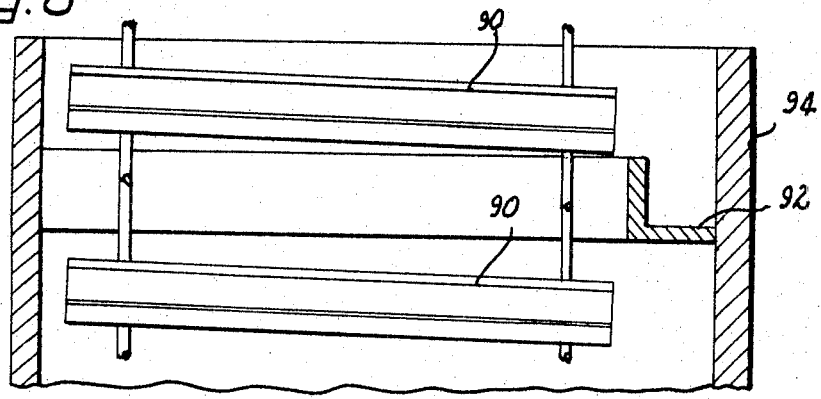
FIGURES 8, 9, 10 and 11 are schematic views showing various possibilities that can be had by different arrangements of the recirculating troughs.

FIGURE 8 shows, schematically, transverse troughs 90 all inclined downwardly toward a single gutter 92 on one side wall of basin 94.

Figure 9:
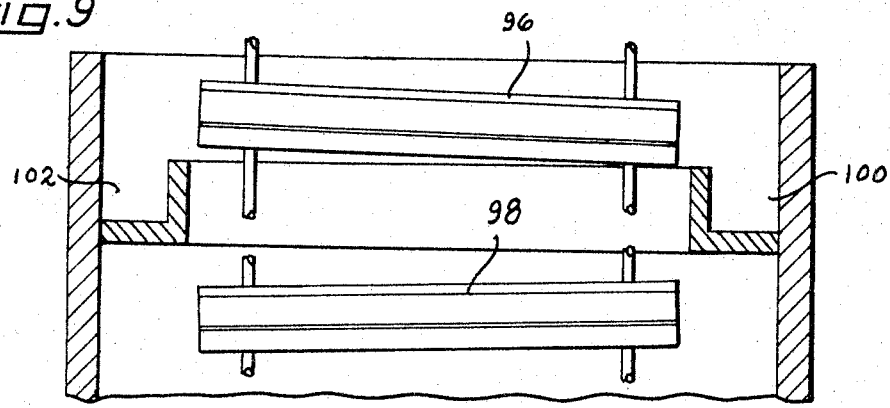

FIGURE 9 shows adjacent troughs 96 and 98 oppositely inclined so one empties into gutter 100 and the other empties into gutter 102, the gutters being on opposite sides of basin 104.

Figure 10:
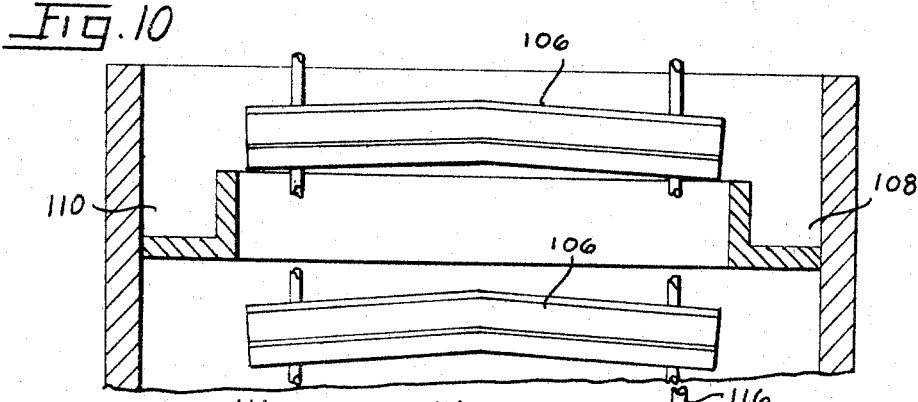

FIGURE 10 shows troughs 106 inclined downwardly toward both ends and emptying into side gutters 108 and 110 on the side walls of basin 112.

Figure 11:
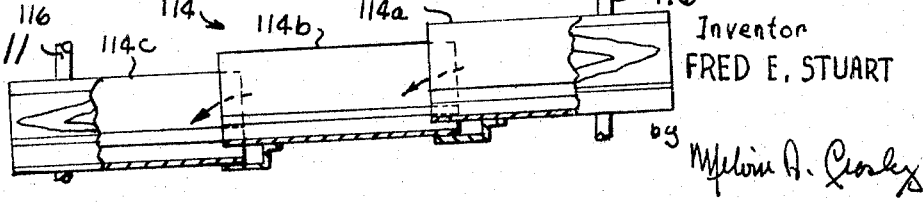

FIGURE 11 shows a particularly important trough modification which provides for aeration of the liquid as it flows in the trough. In FIGURE 11, a longitudinal trough 114 is shown which does not require a gutter but it will be understood that the construction of trough 114 could be adapted to any of the troughs illustrated.

Trough 114 is made up of sections 114a, 114b and 114c, with the sections being connected together in inclined relation and the assembly suspended by drop rods 116 from a beam 118 which, in turn, is carried on the agitator drop arms 120. Each section of the trough is inclined downwardly toward the next succeeding section so the liquid picked up will drop from each section to the next and thus be aerated during its travel in the trough.

Aeration occurs, of course, when the liquid pours out from any of the illustrated troughs, but the FIGURE 11 structure greatly intensifies and augments the aerating action.

As is well known, aeration of the water during treatment inhibits the growth of objectionable organisms therein, except in extended aeration sewage treatment process where the aeration intensifies bacterial activity and the production of growth organisms which is the basis of the contact stabilization and extended aeration treatment process.

From the foregoing, it will be appreciated that the present invention provides an apparatus for water and sewage treatment which circulates the liquid in the flocculation basin and can also aerate the liquid, and a method of treatment of liquids which includes the step of causing circulation of the liquid in the flocculation chamber with or without simultaneous aeration thereof.

It will be understood that this invention is susceptible to modification in order to adapt it to different usages and conditions.

What is claimed is:

1. In a liquid treatment system; a basin to which a liquid together with a flocculating agent is supplied at the entrance end of the basin and flows longitudinally through the basin and is discharged from the basin at the exit end of the basin, and wherein agitators are provided in the basin for agitating the liquid in the basin during its travel therethrough to cause thorough mixing thereof, the improvement comprising circulating means in the basin separate from said agitating means and operable for withdrawing liquid from one longitudinal region of the basin and for conveying the withdrawn liquid to another longitudinal region of the basin to effect mass circulation of the liquid in the basin in addition to the said agitation thereof thereby to enhance the mixing of the liquid with the flocculating agent.

2. A liquid treatment system according to claim 1 in which said circulating means comprises troughs open at the top and at at least one end and vertically reciprocable in the basin from below the level of the liquid therein to above the level of the liquid therein, and supporting means supporting said troughs and operable for effecting said vertical reciprocation thereof.

3. A liquid treatment system according to claim 2, in which said troughs extend in the direction of liquid flow through said basin.

4. A liquid treatment system according to claim 3, in which said troughs are inclined downwardly toward the entrance end of said basin.

5. A liquid treatment system according to claim 3, in which said troughs are inclined in part toward the entrance end of said basin and in part toward the exit end thereof.

6. A liquid treatment system according to claim 2, in which at least one of said troughs is inclined and is in the form of longitudinal inclined sections with the low end of each upper section overlapping and vertically spaced from the higher end of the next lower section so the liquid will cascade along the trough and be admixed with air during its travel along the trough.

7. A liquid treatment system according to claim 2, in which said troughs extend transverse to the direction of liquid flow through said basin and longitudinally extending gutter means are provided in said basin to receive the liquid from said troughs and convey it longitudinally of the basin.

8. A liquid treatment system according to claim 7, in which said gutter means extend along the inside of at least one longitudinal wall of said basin, said troughs when in elevated position discharging into said gutter means, said gutter means being located above the liquid level in the basin and inclining downwardly toward the entrance end of the basin, and a transverse header at the extreme end of the basin into which said gutter means empties and which header, in turn, empties into the basin at the entrance end thereof.

9. A liquid treatment system according to claim 8, in which said troughs are inclined downwardly toward said gutter means.

10. A liquid treatment system according to claim 8, in which said gutter means include a gutter on the inside of each of the said longitudinal walls of the basin and said troughs are in part inclined toward one said gutter and in part toward the other said gutter.

11. A liquid treatment system according to claim 2, in which said agitators comprises vertically reciprocable members mounted on said supporting means beneath said troughs.

12. A liquid treatment system according to claim 2, in which said agitator comprises pairs of horizontal members in said basin, walking beams pivotally supported on top of said basin, said support means comprising drop rods depending from the ends of the beams to said members so that rocking of said beams will cause one of each pair of members to move up in the basin while the other of the said pair of members will move down in the basin, and said troughs being connected to said drop rods so as to move up and down in parallelism with themselves in the basin.

13. The method of liquid treatment in a system wherein the liquid is supplied together with a flocculating agent to a basin at one end of the basin and flows in the longitudinal direction through the basin and is discharged from the other end of the basin and is agitated while in the basin, the improvement which comprises continuously withdrawing liquid and the flocculating agent therein from at least one longitudinal region of the basin and moving it to another longitudinal region of the basin to cause mass circulation of the liquid in the basin and thereby enhance the mixing of the liquid and flocculating agent.

14. The method of liquid treatment in a system according to claim 13, in which the withdrawn liquid is aerated simultaneously with the circulation thereof.

15. The method of liquid treatment in a system according to claim 13, in which the withdrawn liquid is moved from the region of withdrawal thereof from the basin back toward the entrance end of the basin.

16. The method of liquid treatment in a system according to claim 13, in which the liquid is withdrawn from the basin at regions spaced longitudinally along the basin and is moved back toward the entrance end of the basin.

17. The method of water treatment in a system according to claim 13 in which the water is withdrawn from longitudinally extending laterally spaced regions of the basin and is moved toward the entrance end of the basin from some of said regions and toward the exit end of said basin from the other of said regions.

References Cited

UNITED STATES PATENTS

| | | | |
|---|---|---|---|
| 102,354 | 4/1870 | Anderson | 259—112 |
| 1,560,530 | 11/1925 | Blake | 259—112 |
| 2,499,816 | 3/1950 | Carter | 259—4 |

ROBERT W. JENKINS, *Primary Examiner.*

U.S. Cl. X.R.

259—112